United States Patent [19]

McJohnson

[11] 4,024,511
[45] May 17, 1977

[54] MODIFIED BIPHASE MODULATION BAR CODE PRINTER

[75] Inventor: Robert B. McJohnson, Dallas, Tex.

[73] Assignee: Recognition Equipment Incorporated, Dallas, Tex.

[22] Filed: Sept. 25, 1975

[21] Appl. No.: 616,879

[52] U.S. Cl. .............................. 340/172.5; 346/75
[51] Int. Cl.² ................... G06F 1/00; G01D 15/18
[58] Field of Search .................. 340/172.5; 346/75

[56] References Cited
UNITED STATES PATENTS

| | | | |
|---|---|---|---|
| 3,596,276 | 7/1971 | Lovelady et al. | 346/75 X |
| 3,678,465 | 7/1972 | Graham | 340/172.5 |
| 3,875,574 | 4/1975 | Stone | 346/75 X |

*Primary Examiner*—Raulfe B. Zache
*Attorney, Agent, or Firm*—John E. Vandigriff

[57] ABSTRACT

In biphase operations where logic 1's are represented by a logic 0-1 code in a data stream which controls bar code printing, and logic 0's are represented by a logic 1-0 code, the invention involves altering to a logic 0-0 code in the stream each logic 1-0 code which follows a logic 0-1 code.

In a more specific aspect, binary information signals are encoded for detection by a reading system effective within a bandwidth of bar densities. Such encoding is effected by sensing each bit time period of the binary information signal, and representing a logic one level occurring within a bit time period by inserting a logic one level in a trailing half of a corresponding bit time period of an encoded signal. If a logic zero level is sensed in a bit time period of the binary information signal after the detection of a logic one level in an immediately preceding bit time period, logic 0's are inserted in the leading and trailing halves of a corresponding bit time period of the encoded signal. Further, if a logic zero level is sensed in a bit time period of the binary information signal after a logic zero level is detected in the immediately preceding bit time period, a logic one is inserted in the leading half of a corresponding bit time period of the encoded signal. The foregoing steps are repeated for each bit time period of the binary information signal.

6 Claims, 8 Drawing Figures

| BIT BINS | 0 | 1 | 2 | 3 | 4 | 5 | 6 | 7 | 8 |
|---|---|---|---|---|---|---|---|---|---|
| BINARY DATA | 1 | 0 | 0 | 1 | 1 | 1 | 0 | 1 | 0 |
| BAR PATTERN | 1 | | | 1 | 1 | 1 | | 1 | |
| VIDEO WAVEFORM | ∩\ | | | ∩ | ∩ | ∩ | | ∩\ | |

| BIT BINS | 0 | 1 | 2 | 3 | 4 | 5 | 6 | 7 | 8 |
|---|---|---|---|---|---|---|---|---|---|
| BINARY DATA | 1 | 0 | 0 | 1 | 1 | 1 | 0 | 1 | 0 |
| BAR PATTERN | 1 | | | 1 | 1 | 1 | | 1 | |
| VIDEO WAVEFORM |  | | | | | | | | |

TABLE 1

| BIT BINS | 0 | | 1 | | 2 | | 3 | | 4 | | 5 | | 6 | | 7 | | 8 | |
|---|---|---|---|---|---|---|---|---|---|---|---|---|---|---|---|---|---|---|
| BINARY DATA | 1 | | 0 | | 0 | | 1 | | 1 | | 1 | | 0 | | 1 | | 0 | |
| BIPHASE DATA | 0 | 1 | 1 | 0 | 1 | 0 | 0 | 1 | 0 | 1 | 0 | 1 | 1 | 0 | 0 | 1 | 1 | 0 |
| BAR PATTERN | 1 | 1 | 1 | | 1 | | 1 | | 1 | | 1 | 1 | | | 1 | 1 | | |
| VIDEO WAVEFORM |  | | | | | | | | | | | | | | | | | |

TABLE 2

| BIT BINS | 0 | | 1 | | 2 | | 3 | | 4 | | 5 | | 6 | | 7 | | 8 | |
|---|---|---|---|---|---|---|---|---|---|---|---|---|---|---|---|---|---|---|
| BINARY DATA | 1 | | 0 | | 0 | | 1 | | 1 | | 1 | | 0 | | 1 | | 0 | |
| MODIFIED BIPHASE DATA | 0 | 1 | 0 | 0 | 1 | 0 | 0 | 1 | 0 | 1 | 0 | 1 | 0 | 0 | 0 | 1 | 0 | 0 |
| BAR PATTERN | 1 | | | 1 | | 1 | | 1 | | 1 | | 1 | | | | 1 | | |
| VIDEO WAVEFORM |  | | | | | | | | | | | | | | | | | |

TABLE 3

MODIFIED BIPHASE MODULATION BAR CODE PRINTER

CROSS-REFERENCE TO RELATED APPLICATIONS AND PATENTS

This application discloses a printer system complementing the bar code reader disclosed in a copending application entitled "Logarithmically Normalized Cross-Correlation Bar-Code Reader", Ser. No. 601,317, filed Aug. 1, 1975, assigned to the assignee of the present invention and having the applicant hereto as a co-inventor.

The printer system disclosed herein is an improvement to the system disclosed in U.S. Pat. No. 3,596,276, also assigned to the assignee of the present invention and having the applicant hereto as a co-inventor.

FIELD OF THE INVENTION

The invention is related to ink jet printing systems for printing bar codes, and more particularly to a form of biphase modulating the printing of bar codes.

PRIOR ART

The reading performance of bar code readers is strongly influenced by the signal-to-noise ratio of the information signal presented to a bar code detector. The signal-to-noise ratio in turn is dependent upon the bandwidth of the reader.

Heretofore, bar-no-bar modulation has been used in the ink jet printing of bar codes. More particularly, in such modulation, a bar is printed for a logic 1 data input. No printing, i.e., a blank space, represents a logic 0 data input. The time during which a bar may be printed in an encoded data field is referred to as a "bit bin" having two bit spaces therein. As shown in Table 1 of the drawings, it is possible with bar-no-bar modulation to have contiguous bit bins in which no bars occur. The corresponding large time intervals between bars makes the tuning of a reader difficult as the reader bandwidth is large, thereby aggravating the problem of synchronizing the reader electronics with the printed bar responses. In addition, an absence of information redundancy increases the likelihood of read errors.

To overcome the problems associated with the large time intervals between logic 1-0 transitions, a bar/half-bar modulation has been employed in printing bar codes to be read in controlled reading environments. A bar is printed for a logic 1 data input, and a half-bar is printed for a logic 0 data input. Bar/half-bar modulation, however, necessitates the use of a reader having a segmented sensor for distinguishing between differences in amplitude. In reading documents which have changing backgrounds and over-printed bar code data fields, as may occur in the processing of checks in a banking operation, it becomes necessary to detect a bar in an information signal wherein the amplitude variations are too random for reliable detection by a segmented reader.

Biphase modulated bar codes have been found substantially to reduce the problem of reading bar code data in a noisy environment. In contrast to bar/half-bar modulation systems, biphase modulation employs a logic 0-1 code to signify a logic 1, and a logic 1-0 code to signify a logic 0. Such operation is indicated in Table 2 of the drawings.

SUMMARY OF THE INVENTION

The present invention provides a method and system for printing information in a modified biphase modulated bar code form. A logic 1 is printed as a bar in a trailing half of a bit time period during which the binary information bit is expected, a logic 0 which follows a logic 1 is represented by a void in the bit time period, and all other logic zeroes are printed as a bar in the leading half of a corresponding bit time period. Near equal distribution of bars and voids is thus produced in representing a string of logic signals. More particularly, in biphase operations where logic 1's are represented by a logic 0-1 code in a data stream which controls bar code printing, and logic 0's are represented by a logic 1-0 code, each logic 1-0 code which follows a logic 0-1 code is altered to a logic 0-0 code in the data stream.

In a further aspect of the invention, a binary information signal is converted to a true biphase modulated signal wherein each binary bit is replaced by a logic level code occurring in the bit time period. The biphase modulated signal then is scanned, and a transfer to a next occurring logic level is made if a logic zero is detected. If a logic one is detected, however, a transfer is made to a second occurring logic level and a bar is printed in the half of the bit time period in which the logic one was detected. Modified biphase modulation in printing of bars effects reduced transition separation.

DESCRIPTION OF THE DRAWINGS

For a more complete understanding of the present invention and for further objects and advantages thereof, reference may now be had to the following description taken in conjunction with the accompanying drawings in which.

Table 1 is a timing and waveform diagram of a binary information signal and a corresponding bar-no-bar modulated bar code.

Table 2 is a timing and a corresponding biphase modulated bar code.

Table 3 is a timing and a corresponding modified biphase modulated bar code.

DESCRIPTION OF PREFERRED EMBODIMENTS

Biphase modulation printing provides significant advantages over the prior art bar code printing. Biphase modulation provides twice the number of bits and twice the bit rate of bar/no-bar modulation for the same amount of information transferred. Thus, the number of bits per character and the redundancy of information is doubled to improve the reliability of a reader in detecting an information signal in noise. Further, the maximum separation between bar in biphase modulated code is less than the maximum separation in a bar-no-bar modulated code. Filters of a narrower bandwidth may be employed in reading a biphase modulated code than in reading bar-no-bar codes. This increases the signal-to-noise ratio of an information signal over background noise.

Biphase modulation, as above indicated, is shown in Table 2 of the drawings. The clock rate is doubled. A one-zero transition is forced during each bit bin, i.e., the time period during which a bit may occur. The logic 0-1 code represents a logic one and the logic 1-0 code represents a logic zero. Such a biphase code is also known as a Manchester code and termed self-clocking in that a 1-0 transition occurs during each bit time.

A problem exists for both bar code printers and readers when using biphase modulation. This may be appreciated from consideration of the video waveform at bit bins 0 and 1 of Table 2. The occurrence of adjacent bars in contiguous bit bin halves doubles the bar density, and may cause an intersymbol interference. This problem, however, may be circumvented by using the modified biphase modulation on the present invention in which the logic 0-1 code represents a logic one, and either a 0-0 or a 1-0 code may represent a logic zero. Such a modified biphase modulation is shown in Table 3 of the drawings. The logic 0-0 code represents each logic zero which follows a logic 1. All other logic zeroes are represented by the logic 1-0 code.

Modified biphase modulation retains most of the advantages of true biphase modulation while obviating the problem of intersymbol interference. For example, Table 3 shows that the maximum distance between bars in a modified biphase modulated code is one and a half bit bin spaces or voids as compared with one bit bin space for a true biphase modulated code. Modified biphase modulated data, therefore, approaches the 50% increase in redundancy provided by a true biphase modulation.

Further, Table 3 shows that there are no more than one and a half bit bin spaces in sequence. This permits narrow bandpass filters to be used as in true biphase modulation to reject noise frequencies and improve the signal-to-noise ratio. In addition, the frequency of occurrence of bars in a modified biphase modulated data field simplifies the synchronization of reader electronics with printed bar responses, thereby making the tuning of a reading system less critical.

It can be shown that for minimum read errors, the optimum distribution of binary symbols in a bar-encoded data field is an equal distribution of logic 0's and logic 1's. True biphase modulation achieves an absolute equal distribution, while the modified biphase modulation more nearly approaches an equal distribution than does prior bar code modulations.

FIG. 1

Figure 1:
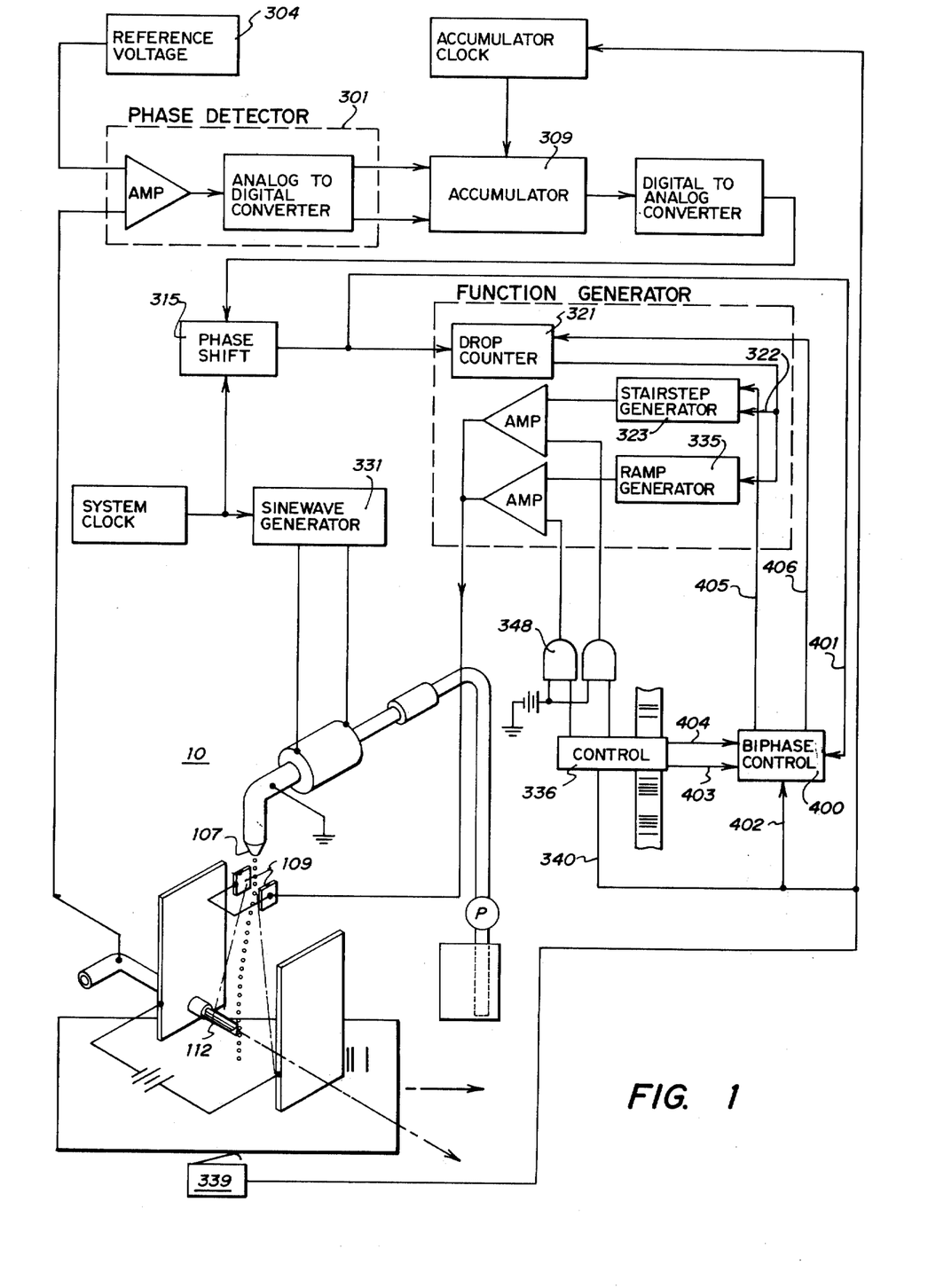
FIG. 1 is a functional block diagram of the invention embodied in an ink jet printing system.

FIg. 1 illustrates an ink jet printer of the type disclosed in U.S. Pat. No. 3,596,276, but which employs the present invention. The system is presented as an exemplary embodiment of the present invention, and in no way is intended to suggest a limitation in the application of the invention. For example, the present invention also may be embodied in laser or impact printing system as well as ink jet printing systems. For clarity, the reference numbers 100-349 have been applied to devices generally as in said patent while reference numbers 400 and above refer to elements of the present invention.

The structure of such an ink jet printer is described in detail in U.S. Pat. No. 3,596,276 and is inobviated by references. In operation, the phase of an ink droplet charging voltage on plates 109 is shifted to synchronize with the instant of droplet breakoff at a nozzle tip 107. Responsive to passage of documents sensed by a sensor unit 339, a control unit 336 applies the output of a ramp generator 335 to charging plates 109. The resultant charges on successive droplets impinging upon an ink catcher 112 are sensed, and compared against a reference voltage on source 304 by phase detector 301. Phase detector 301 in turn generates a phase error signal which is applied through accumulator 309 to adjust phase-shift unit 315. Phase-shift unit 315 controls the delay in phase between the charging voltage applied by stairstep generator 323 during a printing, and the droplet formation voltage generated by a sinewave generator 331. Changes in the time-phase relationship between the time of a droplet breakoff and the droplet charging voltage are corrected thereby, and deterioration in the printing of bars is prevented.

The invention, which improves the printing operation of U.S. Pat. No. 3,596,276, involves use of a modified biphase modulation control unit 400. Control unit 400 receives as inputs a clock signal on line 401 leading from phase-shift unit 315, an item presence signal by way of line 402 leading from document sensor unit 339, a print message length signal supplied by control unit 336 through a data channel 403, and a print message addressed by control unit 336 and transferred as non-return-to-zero (NRZ) data on a data channel 404. Control unit 400 in turn generates a print enable signal on line 405 leading to stairstep generator 323, and a clear signal which is applied to drop counter 321 by way of a line 406.

During the processing of documents having information printed thereon, the printing system of FIG. 1 receives alphanumeric information by means of a data lift system such as an optical character recognition (OCR) or a magnetic ink character recognition (MICR) system. Alternatively, a print message may be read from a storage device. When the document arrives at the printing station as signaled by sensor 339, control unit 400 supervises the printing of the message upon the document as a modified biphase modulated bar code.

If the print message is to be received from a data lift system, control unit 336 issues a message length signal and a serial NRZ print message on channels 403 and 404, respectively, before the arrival of a document at the print station. When sensor 339 detects the presence of a document at the print station, an item presence signal is output on line 402 to initialize unit 400. Unit 400 thereupon processes the data output by control unit 336 and issues a print enable signal along line 405. Stairstep generator 323 is enabled thereby to generate a pedestal voltage with an analog equivalent of the digital signals output by drop counter 321. Control unit 400 generates clear signals at specified times on line 406 in synchronization with the system clock signal supplied by phase-shift unit 315 on line 401. Drop counter 321 is cleared thereby to provide a phase shift in the printing of bars. The phase shift corresponds to a modified biphase modulation as shown in Table 3.

FIG. 2

Figures 2, 3:
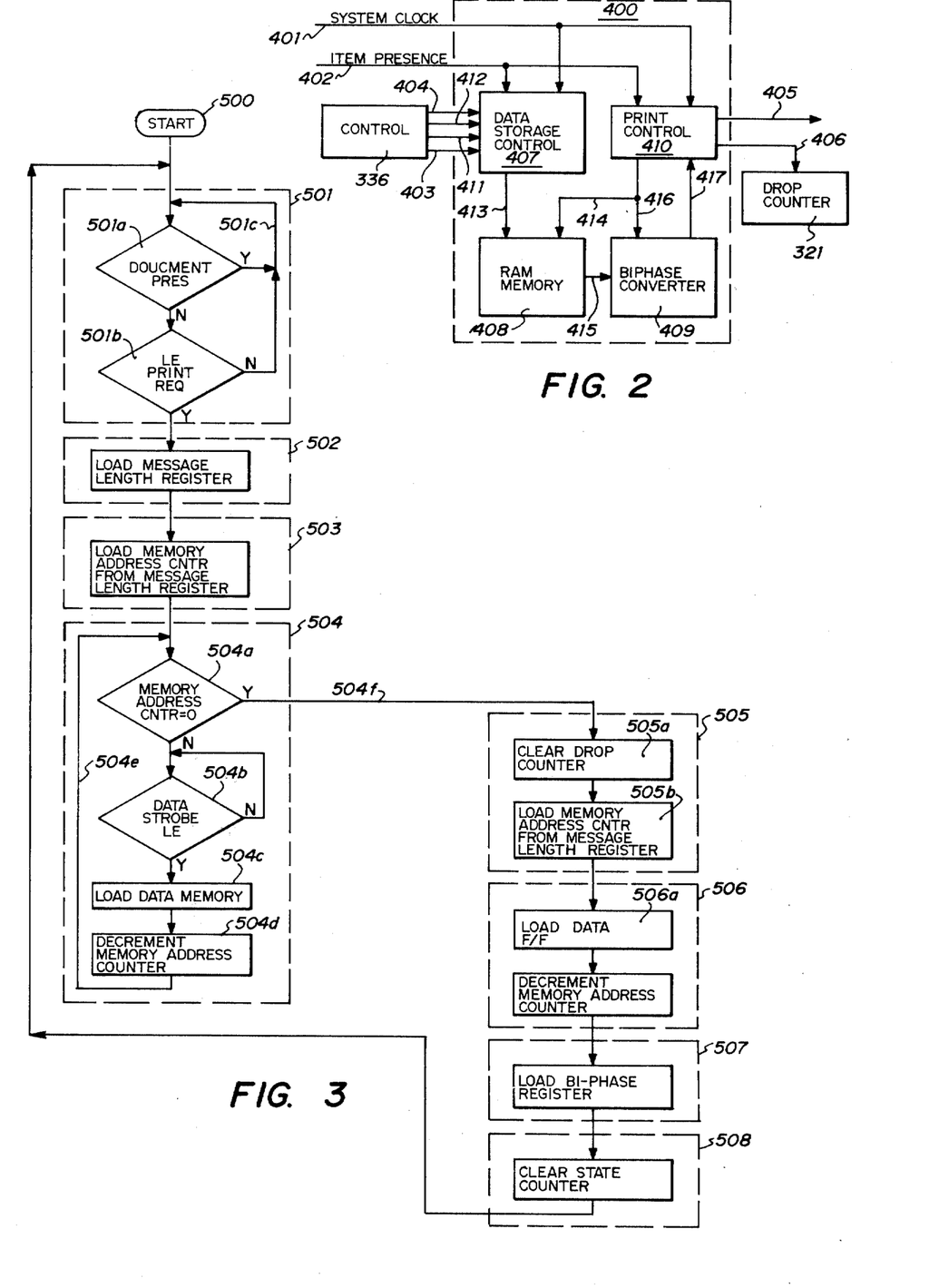
FIG. 2 is a more detailed functional block diagram of the invention.
FIG. 3 is a logic state and flow diagram of a data storage control unit comprising the invention of FIG 2.

FIG. 2 is a more detailed illustration of control unit 400, which includes a data storage control unit 407, a random access memory (RAM) unit 408, biphase converter 409, and a print control unit 410.

Control unit 407 receives from control unit 336 the message length and print message data on channels 403 and 404, respectively, a print request signal by way of a conducting line 411, and a data strobe carried by a conducting line 412.

The output of control unit 407 is applied by way of a data channel 413 to an input of RAM unit 408, which receives control signals by way of a conducting line 414 leading from print control unit 410. RAM unit 408 in turn supplies NRZ data along a data channel 415 to biphase converter 409, which also receives control signals from print control unit 410 by way of a conducting line 416.

Converter 409 converts the NRZ data received from RAM unit 408 to true biphase modulated data as represented in Table 2. The true biphase data is supplied by converter 409 along a data channel 417 upon command of control unit 410.

System clock and item presence signals are applied by lines 401 and 402, respectively, to inputs of control units 407 and 410. Control unit 410 is initialized by an item presence signal, and issues a print enable signal on line 405 and a clear signal on line 406 during a print operation.

In the time interval between passage of documents at the print station, control unit 407 responds to control signals from control unit 336 to transfer the information to be printed upon a document from unit 336 to RAM unit 408. More particularly, before the arrival of a document at the print station, control unit 336 issues both a print request signal on line 411 to initialize data storage control unit 407, and a print message length signal on channel 403. Subsequently, the print message is transmitted on channel 404 as serial NRZ data, and a data strobe is provided on line 412 to direct the control unit 407 to load the data into RAM unit 408.

When a document is detected by sensor unit 339 at the print station, an item presence signal is applied to line 402 to initialize print control unit 410. Unit 410 in turn directs the transfer of the NRZ data from RAM 408 to the biphase converter 409. The converter 409 generates true biphase modulated data which is supplied to unit 410 on command. Unit 410 thereupon processes the true biphase data to control the operation of drop counter 321. More particularly, a print enable signal is issued along line 405 to enable the stairstep generator 323, which in turn provides a pedestal voltage plus an analog equivalent of the digital signals generated by drop counter 321 on line 322. Further, control unit 410 issues a clear signal along line 406 at specified times to clear drop counter 321, and thereby provide a phase shift in the printing of bars corresponding to modified biphase modulation.

As the document passes sensor 339, the print control unit 410 is disabled and the data storage control unit 407 is enabled to prepare for the printing of a next message.

FIG. 3

Referring to FIG. 3, there is illustrated a logical state and flow diagram of the logic decision flow for the data storage control unit 407. Upon entering at a logic step 500, a transfer is made to a logic state 501 comprising logic steps 501a and 501b. At step 501a, a logic decision is made as to the presence of a document at the print station. If a document is at the print station, the decision flow recycles along a decision path 501c until a document presence is no longer detected.

Upon the absence of a document at the print station, a transfer is made from step 501a to step 501b to test for the presence of a leading edge (LE) of a print request signal on line 411. If a leading edge is detected, a transfer is made from state 501 to a logic state 502 to load a print message length signal on channel 403 into a message length register functionally described below. Thereafter, a transfer is made from state 502 to a logic state 503 where a memory address counter of RAM unit 408, also functionally described below, is loaded with the message length signal. A transfer then is made to a logic state 504 comprising logic steps 504a, 504b, 504c and 504d.

At logic step 504a, the memory address counter of memory 408 is scanned for the presence of a zero count. If a zero count is detected, a transfer is made to a logic state 505. If a count other than zero is detected, however, the presence of a print message on channel 404 is indicated, and a transfer is made from step 504a to step 504b to await the leading edge (LE) of a data strobe signal on line 412.

Upon receiving a data strobe from control unit 336, a transfer is made from step 504b to logic step 504c. At step 504c, NRZ data received on channel 404 is loaded into unit 408 at the address currently specified by the memory address counter. A transfer then is made from step 504c to logic step 504d, where the memory address counter is decremented to prepare unit 408 for a next data bit on channel 413. Thereafter, a transfer is made along a logic path 504e to repeat the state 504 process until the entire print message is loaded into memory 408.

When the memory address counter has a zero count therein, a transfer is made along a logic path 504f to a logic state 505 comprising logic steps 505a and 505b. Drop counter 321 is cleared at step 505a, and a transfer is made to a logic step 505b where the memory address counter again is loaded from the message length register.

From state 505, a transfer is made to a logic state 506 to prepare for a printing of the message stored in unit 408. At a logic step 506a, the first of two data bits stored in unit 408 is transferred to an input flip-flop of converter 409. The memory address counter then is decremented at logic step 506b to transfer a second data bit to an input of converter 409. Upon transferring from state 506 to a logic state 507, the first two NRZ data bits are loaded into converter 409. A transfer then is made from state 507 to a logic state 508, where a logic state counter is cleared and step 500 is reentered.

FIG. 4

Figure 4:
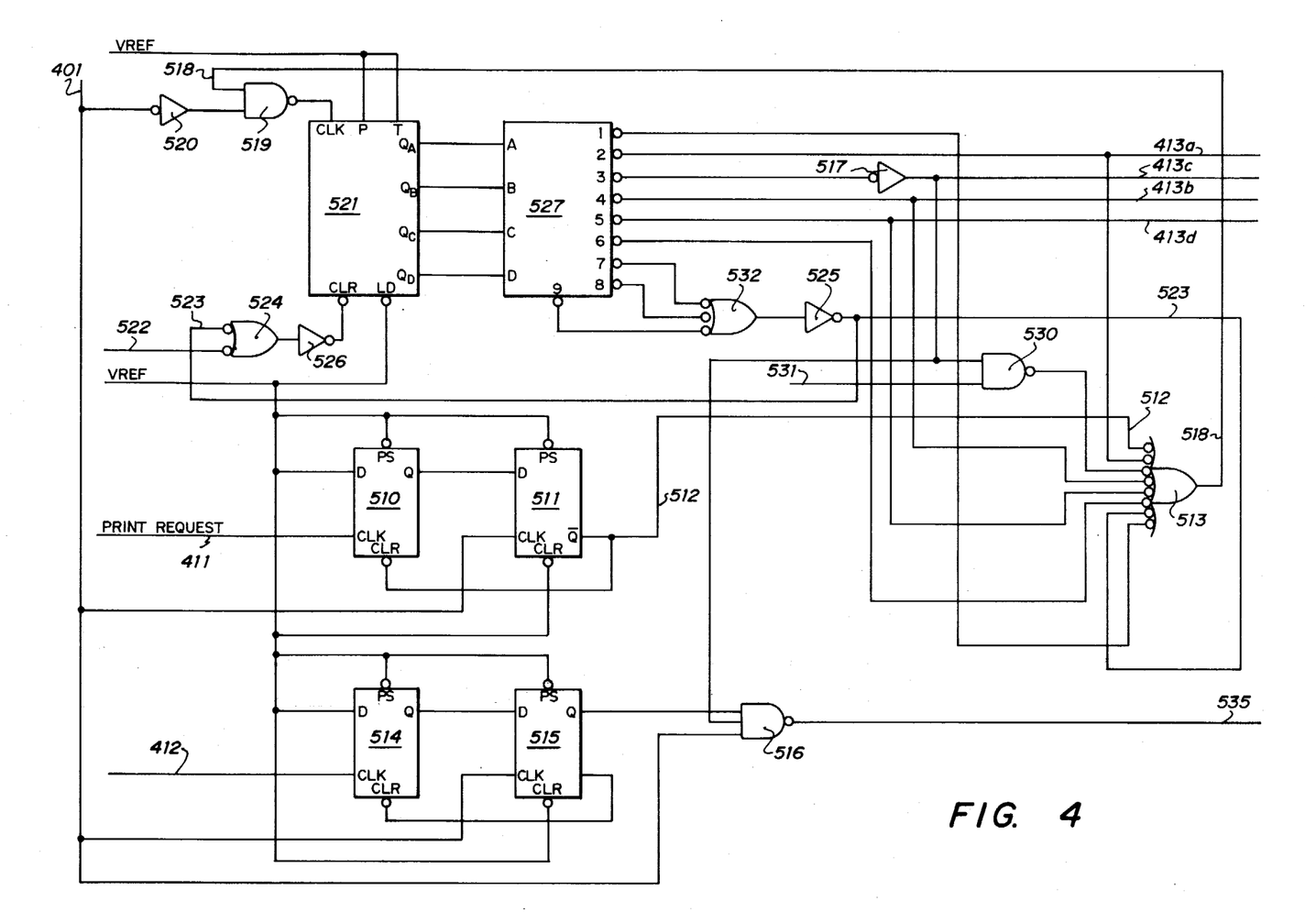
FIG. 4 is an electrical schematic diagram of the data storage control unit of FIG. 3.

FIG. 4 illustrates the data storage control unit 407 in electrical schematic form.

In referring to the electrical schematics illustrated in the Figures, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

As shown in FIG. 4, a print request signal issued by control unit 336 on line 411 is applied to the clock (CLK) input of a flip-flop 510. The D input of the flip-flop is connected to a +5 volt reference, VREF, which also is applied to disable the preset (PS) inputs of flip-flop 510 and a flip-flop 511. The Q output of flip-flop 510 is connected to the D input of flip-flop 511, while the $\overline{Q}$ output of flip-flop 511 is connected to the clear input of flip-flop 510 and to a conducting line 512 leading to one input of a NOR gate 513. The system clock on line 401 is applied to the clock input of flip-flop 511, having a clear input connected to VREF.

In operation, the leading edge of a print request signal on line 411 causes a logic one to be transferred to the Q output of flip-flop 510. Upon the occurrence of a next clock pulse on line 401, the logic one at the Q output of flip-flop 510 is transferred as a logic zero to the $\overline{Q}$ output of flip-flop 511. The logic zero is applied to the clear input of flip-flop 510 to transition the Q output of the flip-flop to a logic zero. Upon the occurrence of a next clock signal, the Q output of flip-flop 510 is transferred as a logic one to the $\overline{Q}$ output of flip-flop 511. Thus, a pulse is generated at the leading edge of the print request signal on line 411, and synchronized with the printer system electronics.

The data strobe signal issued by control unit 336 along line 412 is applied to the clock (CLK) input of a flip-flop 514. The D and preset (PS) inputs of the flip-flop 514 are connected to VREF, as are the preset and clear inputs of a flip-flop 515. The preset inputs of both flip-flops and the clear input of flip-flop 515 thereby are disabled.

The clock input of flip-flop 515 is connected to the system clock by way of line 401, and the Q output of flip-flop 514 is connected to the D input of flip-flop 515. The $\overline{Q}$ output of flip-flop 515 is connected to the clear input of flip-flop 514, while the Q output of flip-flop 515 is connected to one input of a NAND gate 516.

A second input to NAND gate 516 is supplied by an inverter 517, and a third input is connected to the system clock by way of line 401. The output of NAND gate 516 is applied along a conducting line 535 to the RAM memory unit 408 of FIG. 2.

When a data strobe is generated by control unit 336 on line 412, the leading edge of the data strobe causes a logic one to be transferred from the D input of flip-flop 514 to the Q output thereof. Upon a next occurrence of a clock pulse on line 401, the logic one is transferred from the Q output of flip-flop 514 to the Q output of flip-flop 515. Concurrently, a logic zero occurs at the $\overline{Q}$ output of flip-flop 515 to clear flip-flop 514. The Q output of flip-flop 514 thereupon transitions to a logic zero, which is transferred to the Q output of flip-flop 515 upon the next occurrence of a clock signal. A positive going pulse thus is generated upon the occurrence of a leading edge of a data strobe on line 412, and synchronized with the printer system electronics.

If a positive going pulse is generated by flip-flops 514 and 515 while the data storage control unit 407 is in logic state 504, FIG. 3, the system clock on line 401 is gated through gate 516 to enable unit 408 for the storage of NRZ data.

Continuing with the description of FIG. 4, the output of NOR gate 513 is applied as a clock enable signal on a conducting line 518 to one input a NAND gate 519. A second input of NAND gate 519 is supplied by an inverter 520 having an input connected to the system clock on line 401. The output of NAND gate 519 is connected to the clock input of a counter 521, the P and T enable inputs of which are connected to VREF.

A synchronization signal generated by print control unit 410 is applied along a conducting line 522 to one input of a NOR gate 524. A second input of NOR gate 524 is connected by way of a conducting line 523 to the output of an inverter 525. The output of NOR gate 524 in turn is applied through an inverter 526 to the clear input of counter 521, the load input of which is connected to VREF.

The QA-QD outputs of counter 521 are connected to the A-D inputs of a decimal decoder 527. Output 1 of decoder 527 is connected to a second input of NOR gate 513, while output 2 is connected to a third input of NOR gate 513 and to a conducting line 413a of channel 413. Output 3 of decoder 527 is applied through an inverter 517 to a conducting line 413c of channel 413 and to one input of a NAND gate 530. The second input of gate 530 is connected by way of a conducting line 531 to an output of RAM memory unit 408, FIG. 2.

Outputs 4, 5 and 6 of decoder 527 are applied as fourth, fifth and sixth inputs to NOR gate 513. A seventh input to gate 513 is supplied by the output of the inverter 525 on line 523, while an eighth input to gate 513 is connected to the output of NAND gate 530. Output 4 of decoder 527 in addition is connected to a conducting line 413b of channel 413, and output 5 is connected to a conducting line 413d of channel 413. OUtputs 7, 8 and 9 of decoder 527 are connected as inputs to a NOR gate 532, the output of which is connected to the input of inverter 525.

Upon detecting the absence of a document at a print station as represented by the occurrence of a logic zero on line 523, counter 521 enters state 501 of FIG. 3. The subsequent occurrence of a logic zero at an input to NOR gate 513 causes a clock enable signal to be generated along line 518. Upon the occurrence of a clock pulse on line 401, counter 521 is incremented to indicate a change of logic state. The state currently indicated in coded form by counter 521 then is decoded by decoder 527 to transition selected decode outputs to a logic zero. For example, a logic zero at the decode zero output of decoder 527 is an indication that the logic decision flow of control unit 407 is at state 501 of FIG. 3. Similarly, a logic zero at the decode six output indicates a state 507 processing. The data storage control unit 407 thereby works in conjunction with control unit 336 to load a next data message into RAM memory unit 408 of FIG. 2.

FIG. 5

Figure 5:
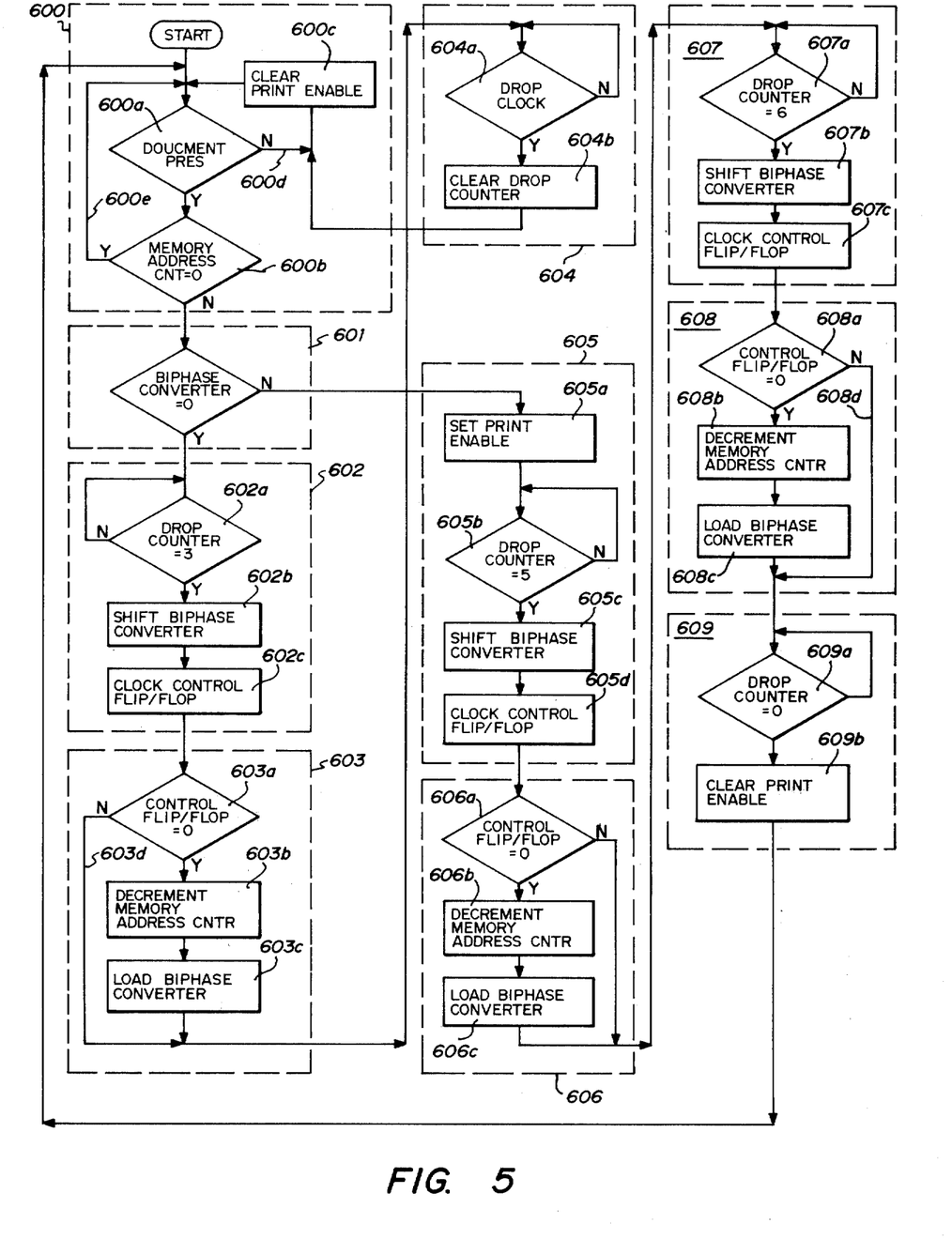
FIG. 5 is a logic state and flow diagram of a print control unit comprising the invention of FIG. 2.

FIG. 5 is an illustration of a logic state and flow diagram of the decision flow for the print control unit 410 of FIG. 2. Upon completion of the data storage control process as illustrated by FIG. 3, entry is made to a logic state 600 comprising logic steps 600a, 600b and 600c. A logic decision is made at step 600a relative to the presence of a document at a print station. If a document is not present, a transfer is made along a logic path 600d to step 600c where the print enable signal on line 405 is cleared.

If a document is present at step 600a, a transfer is made to step 600b where the memory address counter is tested for a zero count. Upon detecting a zero count, a transfer is made along a logic path 600e to repeat the process as before described. If a zero count is not present, however, a transfer is made from state 600 to a logic state 601 to test for the presence of a logic zero at the output of the biphase converter 409. The presence of a logic zero at the output initiates a transfer from state 601 to a logic state 602 comprising logic steps 602a, 602b and 602c.

At step 602a, the drop counter 321 is tested for a count of three. The presence of a count of three indicates a delay of three counts following the sensing of a logic zero at the output of converter 409. Upon detecting a count of three, a transfer is made to step 602b where the converter 409 is shifted one place to the right. A transfer then is made from step 602b to step 602c where a control flip-flop is clocked. A control signal is provided thereby to direct the loading of the biphase converter 409 with an additional two data bits from RAM memory unit 408.

Upon transfer from state 602 to a logic state 603, the control flip-flop is tested at a logic step 603a for a logic zero output. If a logic zero is not present, a transfer is made along a logic path 603d to a logic state 604. If a logic zero is present, however, a transfer is made to a logic step 603b. The memory address counter of memory unit 408 is decremented one count at step 603b to address a second data bit stored in the memory unit. A transfer then is made to a logic step 603c where biphase converter 409 is loaded with a next data bit from memory unit 408. Upon loading memory unit 408, a transfer is made from state 603 to a logic state 604, comprising logic steps 604a and 604b.

At step 604a, the occurrence of a signal from a drop clock of print control unit 10 is awaited. The drop clock signal indicates the occurrence of a total delay of four counts following the detection of a logic zero at the output of converter 409. Upon the occurrence of the drop clock signal, a transfer is made from step 604a to a logic step 604b where the drop counter 321 is cleared. A transfer then is made along a logic path 604c to logic step 600c where the before described logic decision flow is repeated.

Upon returning to logic state 601 the output of biphase converter 409 is sensed, and a transfer is made from state 601 to a logic state 605 when a logic one is detected. At a logic step 605a the print enable signal on line 405 of FIG. 2 is set, and a transfer is made to a logic step 605b to await the occurrence of a five count in the drop counter 321. When the five count occurs, a transfer is made from step 605b to a logic step 605c where the contents of converter 409 are shifted right one place. Upon transferring to a logic step 605d, the control flip-flop of steps 602c and 603a is clocked, and a transfer is made from state 605 to a logic state 606.

State 606 comprises logic steps 606a, 606b and 606c. At step 606a the control flip-flop is tested for a logic zero output, and a transfer is made to step 606b if a logic zero is detected. If a logic one appears at the output of the control flip-flop, however, a transfer is made from step 606a to a logic state 607. The memory address counter is decremented at step 606b to address a new data bit in memory unit 408, and a transfer is made to step 606c where the biphase converter 409 is loaded with the data bit addressed at step 606b. A transfer then is made from state 606c to logic state 607.

State 607 comprises logic steps 607a, 607b and 607c. At step 607a, the drop counter 321 is scanned for a six count, signifying a delay of six counts. If a six count is present, a transfer is made from step 607a to step 607b, where the contents of converter 409 are shifted right one place. Upon transferring to step 607c the control flip-flop is clocked, and a transfer is made from state 607 to a logic state 608 comprising logic steps 608a, 608b, and 608c.

At step 608a, the output of the control flip-flop is tested for a logic zero. If a logic zero is not present at the output of the control flip-flop, a transfer is made from step 608a and along a logic path 608d to a logic state 609. If a logic zero is present, however, a transfer is made to step 608b to decrement the memory address counter of memory unit 408. From step 608b, a transfer is made to step 608c to load the biphase converter 409 with the data bit addressed in memory unit 408. A transfer then is made to a logic state 609 comprising logic steps 609a and 609b.

At step 609a, a zero count in the drop counter 321 is awaited, and a transfer is made from step 609a to step 609b upon the occurrence of the zero count. The print enable signal applied to line 405 is cleared at step 609b, and a transfer is made to step 600a to continually repeat the before described logic decision flow until the print message stored in memory unit 408 is completely processed for printing.

As a further aid to the understanding of the decision flow process of printer control unit 410, reference is made to TABLE 4 where the true and modified biphase representations of a binary message are illustrated. A period of eight system clock counts corresponds to the width of a bit bin. A bit bin is the period of time during which eight ink droplets constituting a single printed bar may be formed. After conversion from binary to true biphase, the printer control unit 410 senses the leading half of bit bin zero to detect a logic zero. A half-bin shift then is made to the trailing half of the bit bin. The system then delays four counts before testing for the presence of a logic one.

Upon detecting the logic one, a shift of a full bit bin is made to the trailing half of bit bin one where the system enters a quiescent period of eight counts. The delay of eight counts, allows the printing of a logic one in the trailing half of bit-bin zero.

As a logic zero is detected in the trailing half of bit bin one, a half-bin shift is made to the leading half of bit bin two followed by a delay of four counts. In this instance, there is no printing of a bar. In bit bin two, a logic one is detected in the leading half of the bit bin to initialize a shift of a full bit bin to the leading half of bit bin three. Following the shift, a delay of eight counts is made to allow the printing of a logic one in the leading half of bit bin two. This operation continues until a true biphase encoded information signal is converted to a corresponding modified biphase modulated code.

FIG. 6

Figure 6:
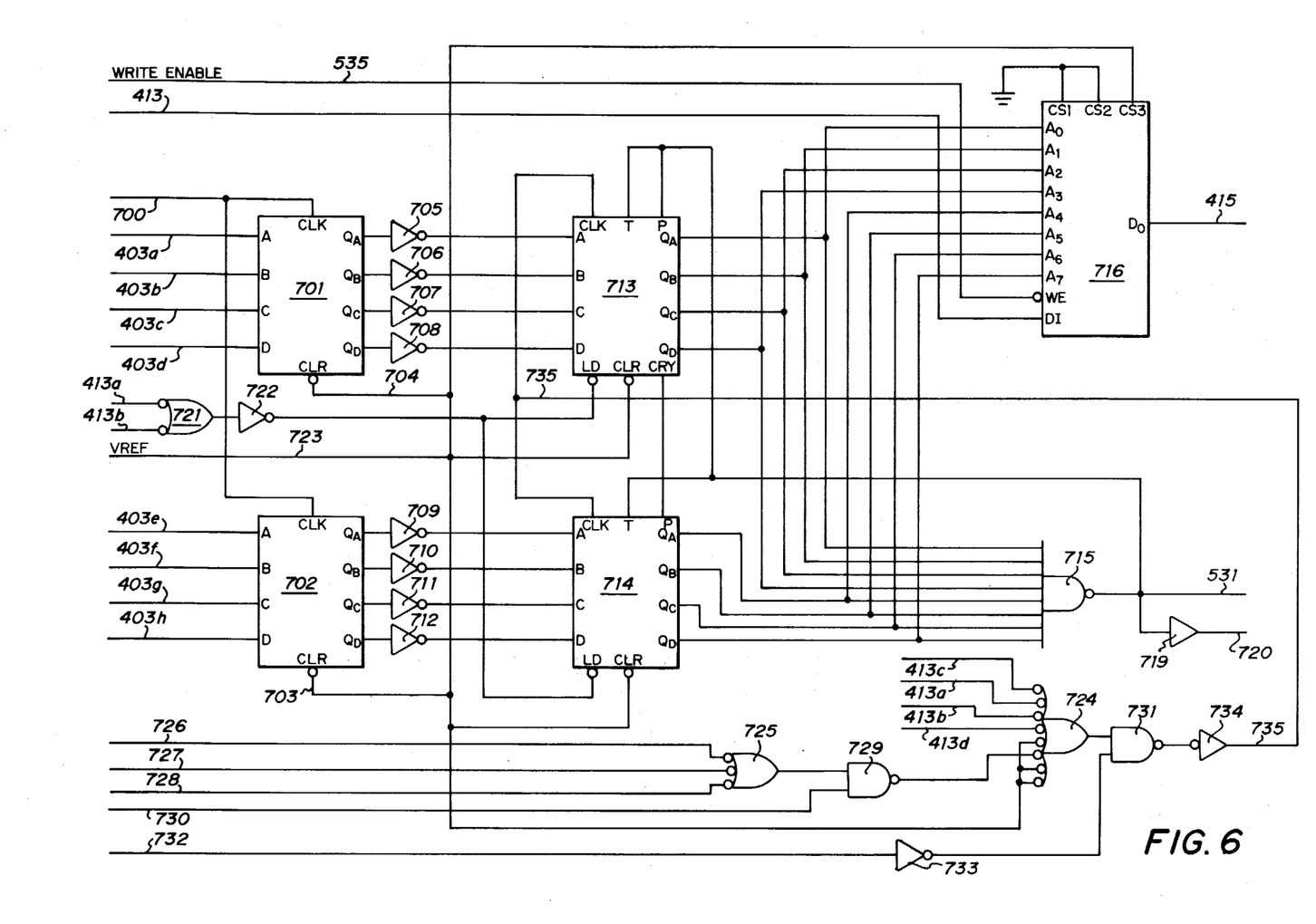
FIG. 6 is an electrical schematic diagram of a memory unit comprising the invention of FIG. 2.

FIG. 6 illustrates memory unit 408 in electrical schematic form. A clocking signal generated by control unit 407 in state 502, FIG. 3, is applied on a conducting line 700 to the clock (CLK) inputs of storage registers 701 and 702. Upon receiving the clock signal, register 701 stores the four least significant bits of a message length signal on conducting lines 403a-403d of channel 403, FIG. 2. In addition, register 702 stores the four most significant bits appearing on conducting lines 403e-403h of channel 403. More particularly, bits 0-3 of the message length signal are applied to inputs A-D of register 701, and bits 4-7 of the message length signal are applied to inputs A-D of register 702. Registers 701 and 702 comprise the message length register referred to in logic state 502 of FIG. 3.

A +5 volt reference signal, VREF, is applied on conducting lines 703 and 704 to the clear (CLR) inputs of registers 701 and 702. The reference signal disables the clear inputs which are activated by a logic zero, and thereby protects against erratic responses to radiative and conductive noise signals.

The QA-AD outputs of register 701 are applied through inverters 705-708 to the A-D inputs, respectively, of an up-counter 713. In like manner, the QA-QD outputs of register 702 are applied through inverters 709-712 to the A-D inputs, respectively, of an upcounter 714. The QA-QD outputs of counter 713 in turn are connected to the inputs to a NAND gate 715, and to the A0-A3 inputs of a random access memory (RAM) 716. The QA-QD outputs of counter 714 are supplied to additional inputs of gate 715, and to the A4-A7 inputs of RAM 716. Counters 713 and 714 comprise a memory address counter addressing memory locations of RAM 716.

RAM 716 is a 16 pin integrated circuit which provides a 256 × 1 bit storage capacity. The write enable (WE) input to RAM 716 is supplied by data storage control unit 407 by way of conducting line 535. In addition, the data input (DI) to RAM 716 is provided by control unit 336 along channel 404 and through channel 413. The chip select one and chip select two inputs (CS1, CS2) of RAM 716 are each grounded. The chip select three input, however, is connected to VREF. When a print message stored in RAM 716 in addressed, the corresponding NRZ data is applied through the DO output of RAM 716 and along data channel 415 to biphase converter 409.

The output of gate 715 is connected to the T and P enable inputs of counter 713, and to the T enable input of counter 714. The output of gate 715 also is applied through an inverter 719 and along a conducting line 720 to print control unit 406. The load signals for counters 713 and 714 are generated by the data storage control unit 407 in states 503 and 505, FIG. 3, and are applied along conducting lines 413a and 413b of channel 413. More particularly, lines 413a and 413b are connected to the decode two and decode four outputs, respectively, of decoder 527, FIG. 4, and to the inputs of a NOR gate 721. The output gate 721 in turn is applied through an inverter 722 to the load (LD) inputs of counters 713 and 714. The clear inputs to counter 713 and 714 are disabled by way of a conducting line 723 connected to VREF.

Data storage control unit 407 also supplies four inputs to a NOR gate 724 by way of lines 413a-413d. Three additional inputs to gate 724 are connected to VREF. An eight input to gate 724 is connected to the output of a NAND gate 729, one input of which is connected to the output of biphase converter 409 by way of a conducting line 730. A second input of gate 729 is connected to the output of a NOR gate 725. The inputs to gate 725 in turn are supplied by print control unit 410 during states 603, 606 and 608 by way of conducting lines 726-728, respectively.

The output of gate 724 is connected to an input of a NAND gate 731, the second input of which is connected to the system clock on a conducting line 732 by way of an inverter 733. The output of NAND gate 731 is applied through an inverter 734, and along a conducting line 735 to the clock (CLK) inputs of counters 713 and 714.

During the time between the arrival of documents at a print station, a message length signal is generated by control unit 336 and applied along conducting lines 403a-403h to be stored in registers 701 and 702. Subsequently, the message length signal is transferred to counters 713 and 714. When control unit 336 issues data strobes along line 412 and NRZ print message data along channel 404, FIG. 2, the NRZ data is loaded into RAM 716 at the location addressed by the outputs of counters 713 and 714. The system clock then is gated through NOR gate 724 to decrement the address appearing at the outputs of the counters 713 and 714, thereby preparing RAM 716 for storage of an additional data bit. When the outputs of counters 713 and 714 are decremented to zero, the gate 715 output is used to enable the counters.

As counters 713 and 714 are up-counters, the outputs of the counters are incremented when the counters are clocked. RAM 716, however, is addressed from the top of memory down. Thus, when there is no message length signal, the outputs of counters 713 and 714 will be a logic one level to address the last cell in memory and to indicate the end of a message. The output of NAND gate 715 thereupon is used to disable the enable inputs to counters 713 and 714, thereby preventing a roll-over from an all logic one state to an all logic zero state.

FIG. 7

Figure 7:
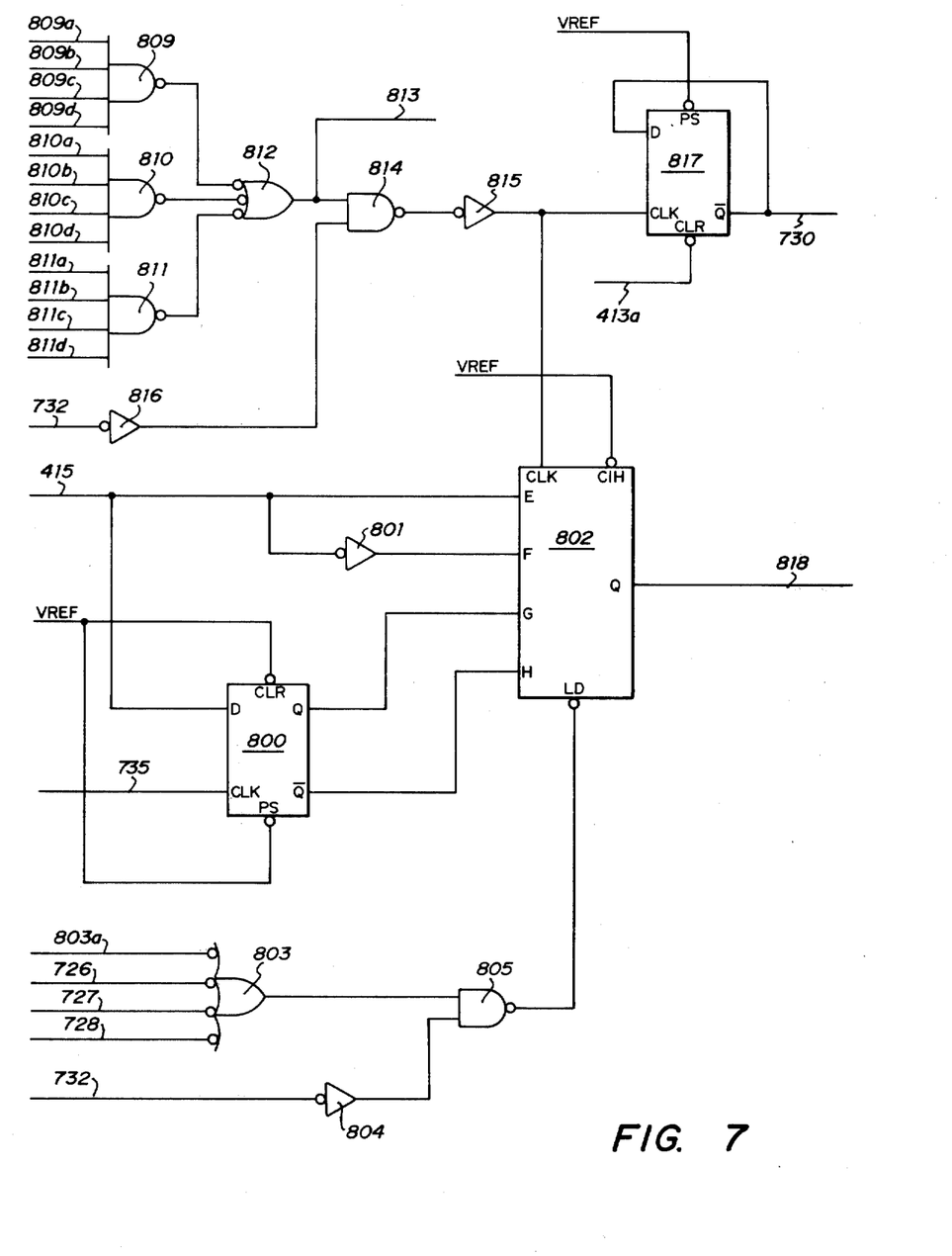
FIG. 7 is an electrical schematic diagram of a biphase converter comprising the invention of FIG. 2.

FIG. 7 is an electrical schematic diagram of the biphase converter 409. The NRZ data output by RAM 716 on channel 415 is supplied to the D input of a flip-flop 800, to the E input of a shift register 802, and through an inverter 801 to the F input of the shift register. The Q output of flip-flop 800 is applied to the G input of shift register 802, while the $\bar{Q}$ output of the flip-flop is applied to the H input of the shift register. The clock (CLK) input to flip-flop 800 is supplied by inverter 734, FIG. 6, on line 735. The preset (PS) and clear (CLR) inputs to flip-flop 800 are each connected to the +5 volt reference, VREF.

A signal is generated by data storage control unit 407 during state 507, FIG. 3, and applied along a conducting line 803a leading from the decode six output of decoder 527, FIG. 4, to an input of a NOR gate 803. In addition, as will be further explained below, print control unit 410 supplies three signals on conducting lines 726, 727, and 728 which are each connected to an input of NOR gate 803. The output of NOR gate 803 in turn is applied to one input of a NAND gate 805, which has a second input connected to the system clock on line 732 by way of an inverter 804. The output of NAND gate 805 is connected to the load input (LD) of shift register 802, the clock inhibit (CIH) input of which is connected to VREF. The QH output of shift register 802 is connected to a conducting line 818 leading to print control unit 410.

Drop counter 321 provides three inputs each to NAND gates 809, 810, and 811. More particularly, the bit zero output of the counter is applied along conducting lines 809a and 810a to NAND gates 809 and 810, respectively, and an inverted bit zero output is applied along a conducting line 811a to one input of NAND gate 811. Further, the bit one output of the drop counter is connected to conducting lines 809b and 811b leading to second inputs of NAND gates 809 and 811, respectively, and an inverted bit one output is connected to a conducting line 810b leading to a second input of NAND gate 810. The bit two output of drop counter 321 is connected by way of conducting lines 810c and 811c to third inputs of NAND gates 810 and 811, respectively. In addition, an inverted bit two output is applied along a conducting line 809c to a third input of NAND gate 809.

A fourth input ot NAND gate 809 is carried by a conducting 809d line during state 602 of print control unit 410, FIG. 5. In addition, a fourth input to NAND gate 810 is supplied by the print control unit on a conducting line 810d during state 605, and a fourth input to NAND gate 811 is provided on a conducting line 811d during state 607 of the print control unit.

The outputs of NAND gates 809-811 are applied as inputs to a NOR gate 812, the output of which is connected to a conducting line 813 and applied to an input of a NAND gate 814. A second input to NAND gate 814 is supplied by the system clock on line 732 by way of an inverter 816. The output of NAND gate 814 in turn is applied through an inverter 815 to the clock input of shift register 802, and to the clock input of a flip-flop 817.

The clear input to flip-flop 817 is connected to line 413a leading from the decode two output of decoder 527, FIG. 4. The preset (PS) input of flip-flop 817 is connected to VREF. The $\overline{Q}$ output of flip-flop 817 in turn is connected to the D input of the flip-flop, and applied by way of line 730 to one input of NAND gate 729, FIG. 6.

In operation, NRZ data is applied along channel 415 to the inputs of shift register 802. A biphase modulation of an NRZ data bit is accomplished with inverter 801 at inputs E and F of shift register 802. In addition, flip-flop 800 provides a biphase modulation of a previous data bit which is supplied to inputs G and H of the shift register. Two NRZ data bits are converted thereby to four biphase data bits.

NOR gate 803, inverter 804 and NAND gate 805 act in combination to provide an enable load signal at specified states of data storage control unit 407 and print control unit 410, as illustrated in FIGS. 3 and 5, respectively. NAND gates 809-811 provide an enable signal to gate the system clock on line 732 through NAND gate 814. Shift register 802 is clocked thereby, as is flip-flop 817. Flip-flop 817 is a control flip-flop which initiates an incrementation of the memory address counter comprising counters 713 and 714, FIG. 6.

FIG. 8

Figure 8:
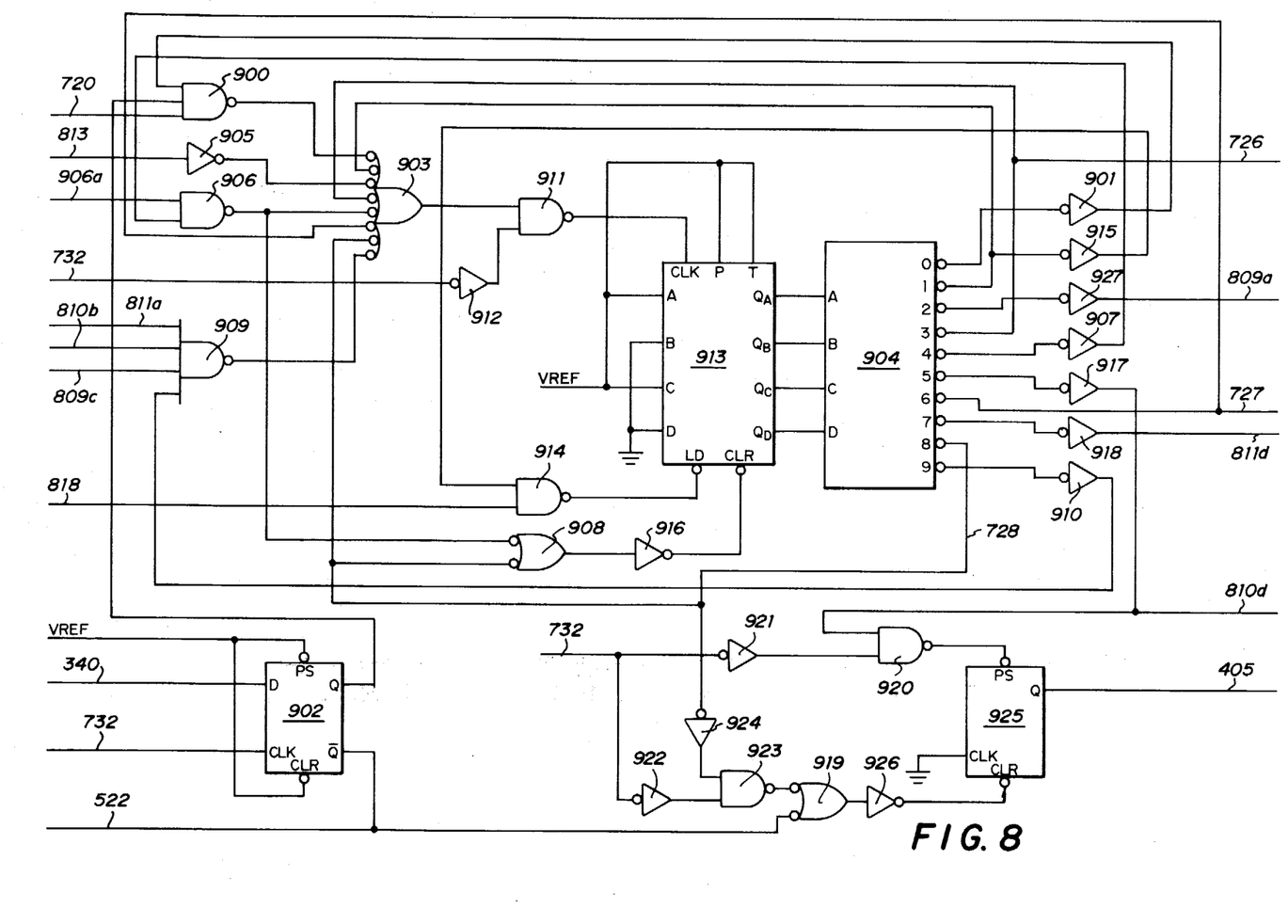
FIG. 8 is an electrical schematic diagram of the print control unit of FIG. 5.

FIG. 8 illustrates in electrical schematic form the print control unit 410, which accepts true biphase data from shift register 802 on line 818, FIG. 7. The print control unit thereupon processes the true biphase data to control the printing of modified biphase modulated information upon a document at a print station.

A first input to a NAND gate 900 is supplied by an inverter 901, the input of which is connected to the decode zero output of a decimal decoder 904. A second input to NAND gate 900 is connected to the Q output of a flip-flop 902, and a third input is supplied by inverter 719 of FIG. 6 by way of line 720. The output of NAND gate 900 in turn is applied as an input to a NOR gate 903.

A second input to NOR gate 903 is supplied by the decode one output of decoder 904. A third input of gate 903 is connected to line 813 leading from converter 409 of FIG. 7 by way of an inverter 905, and a fourth input is connected to the decode three output of decoder 904.

A signal generated by the drop clock (not shown) of logic step 604a, FIG. 5, is applied along a conducting line 906a to one input of a NAND gate 906 having a second input supplied by an inverter 907. The output of NAND gate 906 in turn is applied as a fifth input to NOR gate 903, and to one input of a NOR gate 908. A sixth input to NOR gate 903 is connected to the decode six output of decoer 904, while a seventh input is connected to the decode eight output of the decoder on line 728.

The bit zero, bit one and bit two outputs of drop counter 321 are applied aong lines 811a, 810b and 809c, respectively, to the inputs of a NAND gate 909. A fourth input of gate 909 is supplied by an inverter 910, while the output of the gate is applied as a seventh input to NOR gate 903. The output of NOR gate 903 in turn is connected to a first input of a NAND gate 911, a second input to which is supplied by the system clock on line 732 by way of an inverter 912. NAND gate 911 provides a clock signal to the clock input of a counter 913.

The true biphase output of shift register 802, FIG. 7, is applied along line 818 as an input to a NAND gate 914, the second input of which is supplied by an inverter 915. The output of NAND gate 914 is applied to the load input (LD) of counter 913.

A second input to NOR gate 908 is connected to the decode eight output of decoder 904 by way of line 728. The output of NOR gate 908 is applied through an inverter 916 to the clear (CLR) input of counter 913. The P and T enable inputs of counter 913 are each connected to VREF, which also is applied to the A and C input terminals of counter 913. The B and D inputs of counter 913 are connected directly to ground, while the QA-QD outputs of the counter are applied to the A-D inputs, respectively, of decoder 904.

The decode one output of decoder 904 also is connected to the input of inverter 915, and the decode 2 output is connected to a line 809a leading to an input of gate 809 of FIG. 7. The decode three output of decoder 904 also is applied along line 726 to one input of NOR gate 725, FIG. 6, and to one input of NOR gate 803 of FIG. 7. The decode four output of the decoder is connected to the input of inverter 907, while the decode 5 output is connected to an input of an inverter 917. The output of inverter 917 is applied along line 810d to an input of NAND gate 810 of FIG. 7, and to an input of a NAND gate 920.

The decode six output of decoder 904 in addition is applied along line 727 to an input to NOR gate 725 of FIG. 6. The decode seven output of the decoder is connected to an input of an inverter 918, the output of which is applied along line 811d to an input of NAND gate 811 of FIG. 7. The decode eight output of the decoder is connected to line 728 as befoe described, while the decode nine output is applied as an input to inverter 910.

An item presence signal issued by sensor unit 339 on line 340 of FIG. 1 is applied to the D input of the flip-flop 902. The system clock on line 732 is connected to the clock input of the flip-flop, and the clear and preset inputs of the flip-flop are connected to VREF. The $\overline{Q}$ output of flip-flop 902 is applied to control unit 407 by way of line 522, and to an input of a NOR gate 919. Flip-flop 902 synchronizes the item presence signal on line 340 with the printer electronics.

When the Q output of flip-flop 902 is at logic zero, the data storage control unit 407 is enabled. When the Q output is at a logic one level, however, the print control unit 410 is enabled. Thus, serial NRZ data is loaded into memory unit 408 between documents; however, printing occurs only when a document is at a print station.

A second input to NAND gate 920 is supplied by the system clock on line 732 by way of an inverter 921. The output of NAND gate 920 in turn is connected to the preset (PS) input of a flip-flop 925, the clock input of which is connected to ground. The system clock also is applied through an inverter 922 to one input of a NAND gate 923. The second input to NAND gate 923 is supplied by an inverter 924, the input to which is connected to the decode eight output of decoder 904. The output of NAND gate 923 is applied as a second input to NOR gate 919, the output of which is connected through an inverter 926 to the clear (CLR) input of flip-flop 925. The Q output of flip-flop 925 is applied along line 405 to stairstep generator 323, FIG. 1.

In operation, the output of NOR gate 903 provides an enable signal to gate the system clock through NAND gate 911 to the clock input of counter 913. NAND gate 914 provides a load enable signal to counter 913 to cause a transfer from state 601 to state 605 of FIG. 5. Such a transfer occurs whenever a logic one is present at the output of biphase converter 409 of FIGS. 2 and 7.

NOR gate 908 issues a clear signal to counter 913 to initiate a transfer from state 603 to state 600 whenever a logic zero is present at the output of converter 409. The output of counter 913 is an encoded indication of the current processing state of print control unit 410. The encoded state number in turn is applied to decoder 904, where the present processing state of print control unit 410 is indicated by a logic zero occurring on a decode output line. When logic zeroes appear at the output of converter 409, a no-print condition exists. In addition, a no-print condition exists when there is no document present at the print station. When either of these conditions occur, a logic zero is applied to the clear input of flip-flop 925, thereby causing a logic zero at the Q output of the flip-flop which is applied as a disable signal to stairstep generator 323. When a bar is to be printed under the control of print control unit 410, however, a logic one is prested to the preset input of flip-flop 925, thereby raising the Q output of the flip-flop to a logic one level to enable the stairstep generator 323.

In accordance with the invention, there is provided a method and system for applying a modified biphase modulation to the printing of bar codes. A binary information signal is converted to a true biphase modulated signal, which in turn is operated upon to provide print control signals effecting a phase shift in the printing of bars. A modified biphase modulated bar code representation of the binary information signal is provided thereby, with a reduced separation between bars and a near equal distribution of bars and voids within successive bit time periods.

Having described the invention in connection with certain specific embodiments thereof, it is to be understood that further modifications may now suggest themselves to those skilled in the art. For example, a modified biphase modulation may be applied to a laser bar code printer or other system limited by bar density restrictions. It is intended to cover such modifications as fall within the scope of the appended claims.

What is claimed is:

1. A method of printing a binary information signal upon a document surface as a modified biphase modulated bar code, which comprises:
    a. converting said binary information signal to a true biphase modulated digital signal wherein each binary bit is replaced by a logic level code occurring within a bit time period;
    b. sensing a first logic level, and shifting to a next occurring logic level if a logic zero is detected or to a second occurring logic level if a logic one is detected;
    c. upon detecting a logic one in step (b), printing a bar in the bit time period half in which said first logic level appears;
    d. repeating steps (b) and (c) until said true biphase modulated digital signal is entirely printed as a modified biphase modulated bar code.

2. The method set forth in claim 1, wherein the step of converting said binary information signal includes the steps of inserting a logic 0-1 code during a logic one bit time period, and inserting a logic 1-0 code during a logic zero bit time period.

3. In a bar code printer system having a document sensor, system control means, ink droplets forming means and ink droplet charging means, the combination which comprises:
    a. droplet forming means for generating a vibrating voltage to produce ink droplets from a steam of ink;
    b. biphase converting means for applying a true biphase modulation to a binary information signal received from said system control means; and
    c. print control means responsive to said document sensor and operating upon the output of said biphase converting means to control the duty cycle of said ink droplet charging means, thereby applying a modified biphase modulation to the printing of bars.

4. A bar code printing system for printing a modified biphase modulated bar code representation of a binary information signal, which comprises:
    a. printing means for printing bars upon a document;
    b. modulation means for applying true biphase modulation to said binary information signal; and
    c. print control means responsive to control signals generated by said printing means and operating upon the true biphase modulated output of said modulation means for controlling the printing operation of said printing means, thereby effecting a phase shift in the printing of bars corresponding to a modified biphase modulation.

5. An ink jet printer system for printing modified biphase modulated bar codes, which comprises:
    a. droplet forming means for generating a vibrating voltage to produce ink droplets from a stream of ink;
    b. system control means for detecting the presence of a document, for supervising the transfer of a binary information signal preparatory to a printing operation, and for controlling the application of a charging voltage to said ink droplets;
    c. phase shift control means sensitive to the charge applied to said ink droplets for forming a first control signal to vary the phase of said charging voltage, thereby maintaining a time-phase relationship with said ink droplets;
d. print control means responsive to said system control means and operating upon said binary information signal for generating a second control signal synchronous with said first control signal to effect a modified biphase modulation of said charging voltage; and
e. droplet charging means responsive to said system control means and to said first second control signals for generating said charging voltage.

6. The combination set forth in claim 5, wherein said print control means includes:
a. a RAM memory for storing said binary information signal received from said system control means; and
b. a biphase converter operating upon the output of said RAM memory to form a true biphase modulated signal comprised of logic level codes, each of said logic level codes occurring within a bit time period of said binary information signal.

* * * * *